Patented Sept. 19, 1944

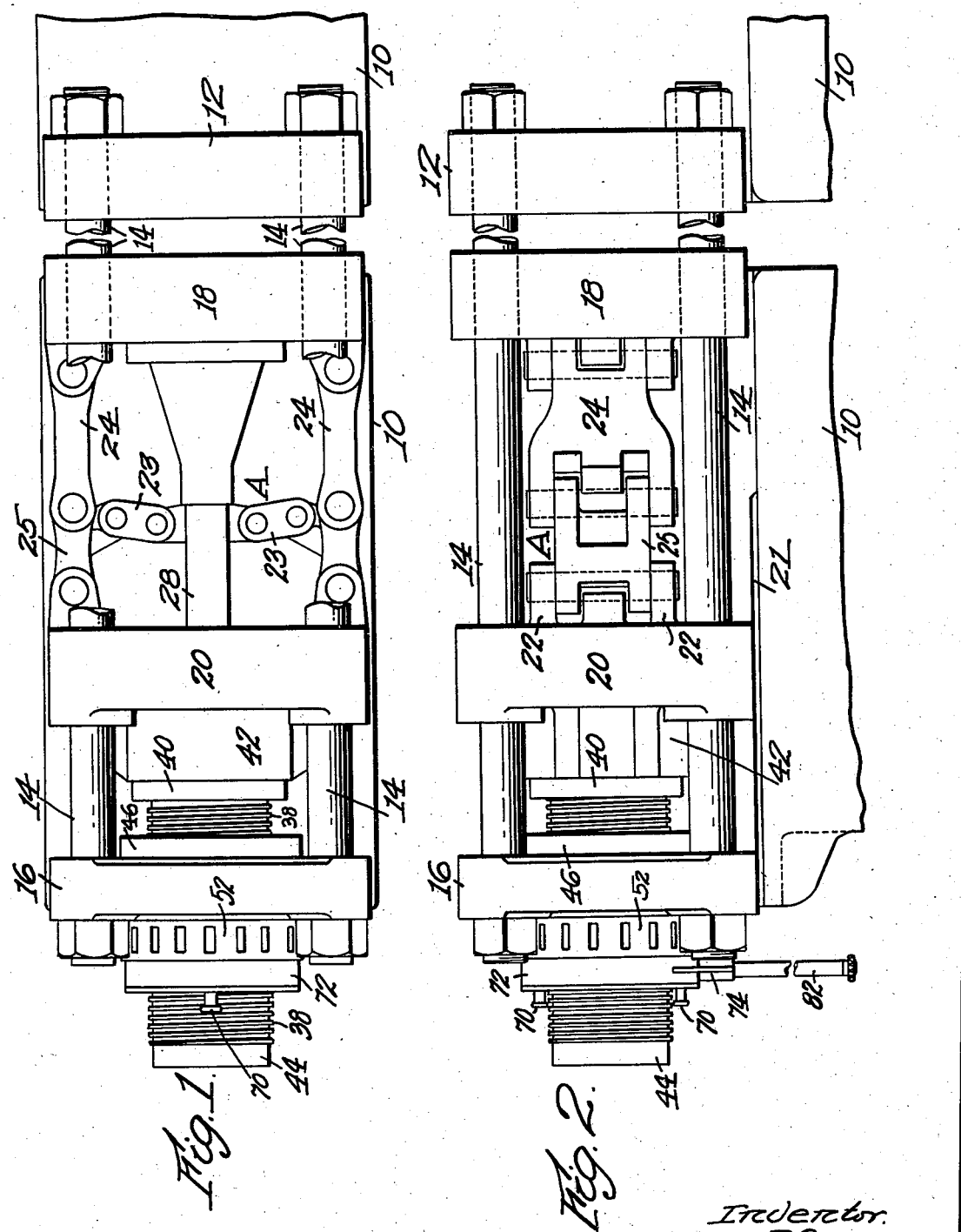

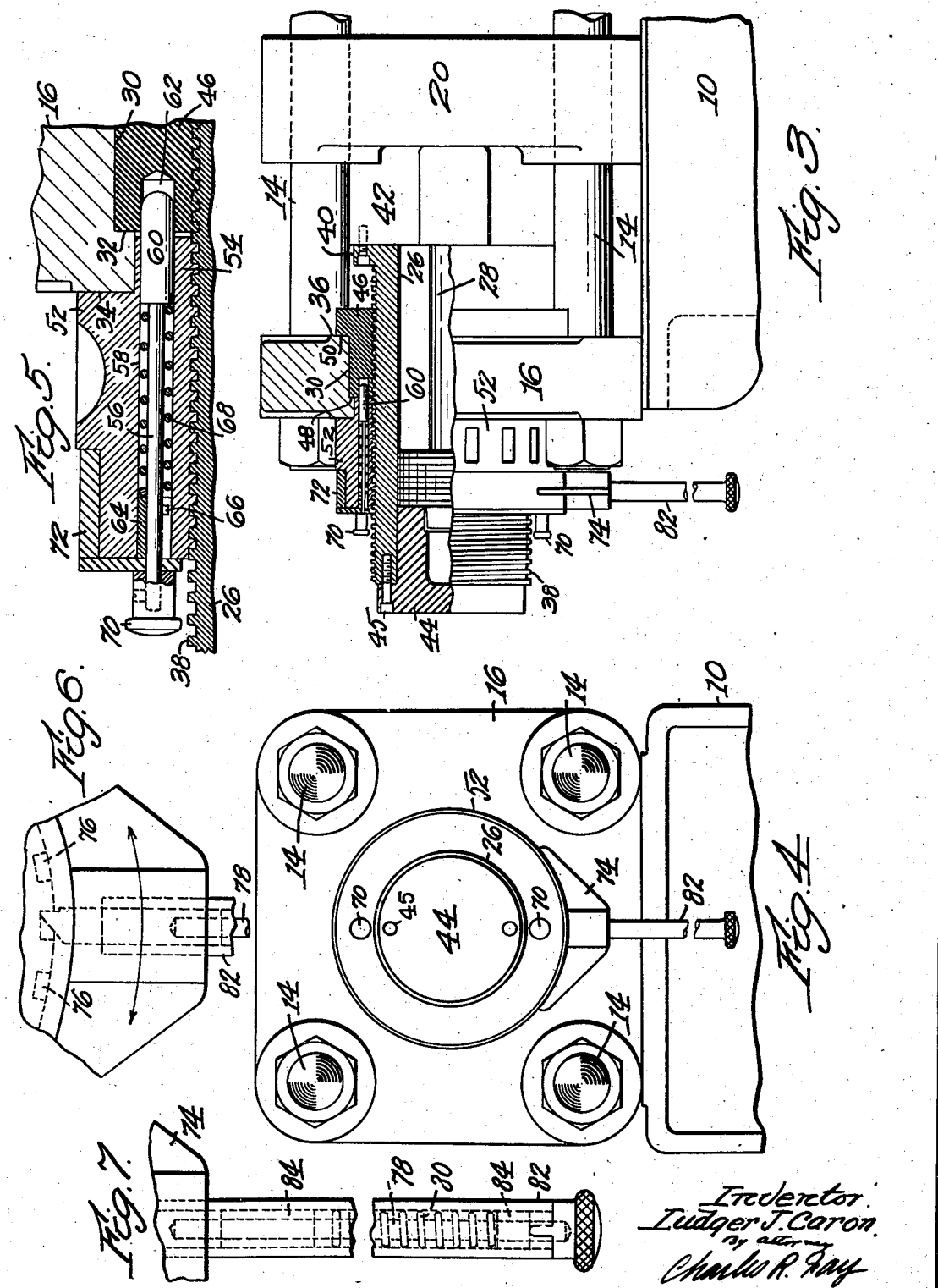

2,358,686

UNITED STATES PATENT OFFICE 2,358,686

INJECTION MOLDING MACHINE

Ludger J. Caron, Leominster, Mass., assignor to Leominster Tool Co., Inc., Leominster, Mass., a corporation of Massachusetts Application December 24, 1940, Serial No. 371,480

4 Claims. (Cl. 18—16)

This invention relates to injection molding machines particularly of the type for the pressure molding of materials in a plastic or fluid state in permanent molds of the shape of the finished article.

Objects of the invention include the provision of an injection molding machine having a fixed and a movable die plate, and an accurate, relatively simple means for adjusting the operating range of the movable die plate; the provision of an oil cylinder having a piston for opening and closing the die plates, and means for directly adjusting the position of the cylinder and hence the die space; the provision of an adjustable oil cylinder having a piston connected to a toggle linkage in turn connected to the movable die plate, whereby adjusting the cylinder bodily will adjust the die plate; the provision of an oil cylinder having screw threads on its exterior surface in combination with a separable two part nut, said nut being prevented from longitudinal travel when connected, and said nut being capable of clamping the parts in adjusted position when the two parts of the nut are separate; and the provision of an injection molding machine of improved and simplified construction.

Other objects and advantages of the invention will appear hereinafter.

Reference is to be had to the accompanying drawings, in which

Fig. 1 is a top plan view of a machine embodying the present invention;

Fig. 2 is a side elevation thereof;

Fig. 3 is an enlarged elevation of the cylinder end of the machine, parts being in section;

Fig. 4 is a rear elevation of the machine;

Fig. 5 is an enlarged sectional view of the nut connection;

Fig. 6 is a detail of the ratchet; and

Fig. 7 is a detail of the ratchet handle.

In Figs. 1 and 2, the machine bed or base is shown at 10, and a fixed die plate 12 is mounted at one end of the base. Four heavy rods 14 connect the fixed die plate to a fixed plate 16 at the rear of the base 10, these plates and rods forming a heavy rigid frame fixed to the machine base. A movable die plate 18 is mounted to slide on rods 14 to open and close the dies which are adapted to be secured to the adjacent faces of the die plates in the usual manner. A movable head plate 20 is adjustably mounted on rods 14 to slide on the base at 21, and this plate carries pintle supports 22 for the toggle indicated generally at A, as well as providing a support for the oil cylinder 26 and a guide for the piston rod 28. Toggle A is of the type which, when extended, cannot be retracted except by a rearward movement of the piston rod, the latter being pivoted to links 23 extending substantially at right angles to links 24, when the linkage is extended. Links 25 are pivoted to the supports 22, and links 24 are pivoted to plate 18.

As is well understood in the art, the piston rod 28 is actuated by oil in cylinder 26 thru connections, not shown to extend and retract the toggle linkage and thus reciprocate the movable die plate 18 with respect to the stationary die plate 12, the two parts of the die being located on adjacent faces of the die plates. When the die is closed, by this action, a plastic is forced into it to form the article, and when the die is separated, the article is extracted. The injection mechanism is not disclosed as it is well known in the art and forms no part of the present invention.

It is recognized that dies of various sizes will be necessary to mold different articles, hence the die plates must be mutually adjustable to vary the location of the range of the movable plate so that closed position of the plates can be varied to accommodate the different dies. Many schemes have been proposed in the prior art whereby this adjustability may be accomplished, but the present invention is directed to a simpler and more positive device which is less expensive of manufacture and presents no opportunities for the parts to get out of order.

Referring to Figs. 3 and 5, it will be seen that the plate 16 is provided with a large bore 30 countersunk to present a shoulder 32 as well as the two outside surface shoulders 34 and 36. The oil cylinder 26 extends thru the bore and is provided with a large exterior screw thread 38 throughout its length. At one end, the cylinder has a lateral flange 40 by which it is secured to a rearwardly extending abutment 42 on the head plate 20, whereby the cylinder and head plate are rigidly secured together. At its other end, the cylinder is provided with a head 44 bolted thereto as at 45 for oil connections, this head being recessed to accommodate the threaded cylinder as shown.

A large nut 46 is exteriorly mounted to rotate in bore 30 and has stepped shoulders 48, 50 to abut shoulders 32, 36, respectively, in plate 16. The threads 38 on cylinder 26 mesh with the interior threads of the nut, the cylinder of course passing thru the nut. A second nut 52 on the opposite side of plate 16 is also threaded to mesh with cylinder 26, and has an end face adapted to abut shoulder 34, as well as a cylindrical extension 54 journaled in the reduced portion of bore 30. As shown in Fig. 5, the extension 54 and shoulder 32 of nut 46 need not meet, but in any case, the nuts 46 and 52 will be seen to form a support for the cylinder 26 in bore 30, although these nuts are separate.

Means are provided to connect the nuts for simultaneous rotation, and this comprises a plurality of axially movable pins 56 passing completely thru nut 52 in bores 58 in the direction shown. Each bore 58 is larger in diameter than its pin and the latter is provided with an end head 60 fitting bore 58 and a corresponding end bore 62 in nut 46. A collar 64 is fitted in each bore 58 and a key 66 on each pin slides in a slot in the collar. Each pin is equipped with a compression spring 68 between the collar and head to normally urge the latter into bore 62. Hand grips 70 are provided whereby the pins may be retracted from engagement in bores 62.

Any convenient means may be provided to rotate the nuts, but as it is desired to utilize nut 52 as a clamp when the pins are retracted, the rotating means is applied to this nut. In the present form of the invention, the rotating means takes the form of a ratchet, and the nut is recessed peripherally to accommodate a strap 72 carrying a depending boss 74 at the recess, nut 52 is provided with radial depressions 76 for the reception of the end of an axially movable headed rod 78 which is normally urged by a spring 80 into engagement with the nut recess or a depression 76, if aligned therewith. The rod is housed in a tube 82 carrying stops 84 for the spring 80.

In the operation of the device, it being desired to adjust the position of operative range of the movable die plate 18 with relation to the fixed plate 12 in order to accommodate a larger or smaller die, the piston is advanced to fully open the toggle so that the die space, between the die plates, can be determined. This condition is shown in Figs. 1 and 2. The pins 56 are insured of engagement in bores 62, and the ratchet handle 79 is actuated to turn the now combined nuts, the plate 16 clearly acting as a bearing and a means to prevent axial movement thereof. Hence the cylinder 26 must be moved axially, carrying with it the head plate 20, toggle 24, and die plate 18. The piston cannot move as it will be trapped by the oil in the cylinder, and in any event the outer toggle links 24, 25 being aligned, the toggle cannot act except as a rigid link between plates 18 and 20.

When the die plate 18 has reached its new position with relation to plate 12, pins 56 are manually retracted and the ratchet handle 79 is again actuated to close up nut 52 against shoulder 34 on plate 16, thus frictionally clamping the cylinder 26 in place by the two nuts as abutments in conjunction with plate 16. In this condition, the heads 60 of the pins merely bear against the end surface of nut 46, and when a new adjustment is desired, the nut 52 is backed off sufficiently to unclamp the cylinder. When pins 56 enter the bores 62, in an automatic manner under influence of springs 58, the new adjustment may be made.

Having thus described my invention and the advantages thereof, I do not wish to be limited to the details herein disclosed, otherwise than as set forth in the claims, but what I claim is:

1. In a molding plastic injection machine, a fixed element, a screw-threaded cylinder, a pair of nuts rotatable in said fixed element and bearing on opposite sides of the same, said nuts meshing with said cylinder, means to selectively connect or disconnect said nuts, and means to rotate one nut, said nuts being thereby rotatable together when they are connected to selectively advance or retract said cylinder in said machine.

2. A plastic injection molding machine comprising a pair of die plates, one of which is reciprocable with respect to the other, a cylinder and piston adapted to reciprocate said one die plate; means to adjust said reciprocable die plate, said means comprising a fixed plate, a movable plate, a rigid connection between said movable plate and said cylinder, threads on the exterior of said cylinder, a nut associated with said fixed plate and meshing with said threads, said nut comprising two separate parts, one on each side of said fixed plate, means selectively connecting said parts to adjust the cylinder upon rotation of the nut, and means for rotating one part when the parts are disconnected to clamp the cylinder against the fixed plate.

3. In a plastic injection molding machine, a pair of relatively movable die plates, a fixed element, a screw-threaded power cylinder having a piston connected to one die plate to reciprocate it, a pair of nuts meshing with said cylinder and bearing against opposite sides of said fixed element, means to selectively connect or disconnect said nuts, and means to rotate one nut, whereby said cylinder is axially movable when said nuts are connected, said one nut being capable of frictionally clamping said cylinder to said fixed element when said nuts are disconnected.

4. A plastic injection molding machine comprising a pair of die plates, a guide rod extending thru said plates, and one of said plates being slidably mounted on said rod; an element mounted in fixed relation on said rod, a second element mounted to slide freely on said rod, a cylinder having one end fixed to said second element, said first element providing a support for the other end of said cylinder, an adjustable connection between said first element and said cylinder, a linkage between said one plate and said second element, said adjustable connection comprising a nut at each side of said first element, said nuts surrounding said cylinder, the latter having threads meshing with said nuts, and means adapted to selectively connect or disconnect said nuts.

LUDGER J. CARON.